(12) United States Patent
Pugh et al.

(10) Patent No.: US 7,140,012 B2
(45) Date of Patent: Nov. 21, 2006

(54) METHOD AND APPARATUS FOR MULTI-VERSION UPDATES OF APPLICATION SERVICES

(75) Inventors: William A. Pugh, Seattle, WA (US); Brendan X MacLean, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 883 days.

(21) Appl. No.: 09/912,571

(22) Filed: Jul. 24, 2001

(65) Prior Publication Data

US 2003/0187929 A1    Oct. 2, 2003

Related U.S. Application Data

(63) Continuation-in-part of application No. 09/803,178, filed on Mar. 9, 2001.

(51) Int. Cl.
G06F 9/44 (2006.01)
G06F 9/445 (2006.01)
G06F 12/00 (2006.01)
G06F 13/00 (2006.01)

(52) U.S. Cl. ............. 717/170; 717/163; 717/171; 717/176; 707/203; 719/328

(58) Field of Classification Search ........ 717/168–178, 717/163; 707/203; 719/328
See application file for complete search history.

(56) References Cited

U.S. PATENT DOCUMENTS 5,475,817 A   12/1995  Waldo et al.
5,915,112 A   6/1999   Boutcher
6,009,274 A * 12/1999  Fletcher et al. ............. 717/173
6,035,423 A   3/2000   Hodges et al.
6,080,207 A   6/2000   Kroening et al.
6,088,803 A   7/2000   Tso et al.
6,094,679 A   7/2000   Teng et al.
6,185,734 B1  2/2001   Saboff et al.
6,188,995 B1  2/2001   Garst et al.
6,272,677 B1  8/2001   Lam et al.
6,324,692 B1 * 11/2001  Fiske ......................... 717/171
6,332,168 B1 * 12/2001  House et al. ............... 719/331
6,718,549 B1 * 4/2004   Narin et al. ................. 717/178

* cited by examiner

Primary Examiner—Antony Nguyen-Ba
(74) Attorney, Agent, or Firm—Schwabe, Williamson & Wyatt, P.C.

(57) ABSTRACT

Successor versions of an application service provision runtime library of an application service provision apparatus are provided with corresponding update services to facilitate upgrade of applications to selected ones of the successor versions on request. In various embodiments, a dispatcher of the application service provision apparatus is provided with complementary functions to coordinate the servicing of the upgrade requests. In some embodiments, each of the update services is equipped to upgrade the application from an immediate predecessor version of the runtime library. In other embodiments, each of the update services is equipped to upgrade the application from any predecessor version of the runtime library.

24 Claims, 7 Drawing Sheets

300

| Application ~ 312 | Runtime Version ~ 314 | Time Last Used ~ 316 |
|---|---|---|
| | | |
| | | |
| | | |

| Runtime Version ~ 406 | Memory Req ID ~ 402 | Time Last Used ~ 404 | |
|---|---|---|---|
| | | | |
| | | | |
| | | | |

Figure 4

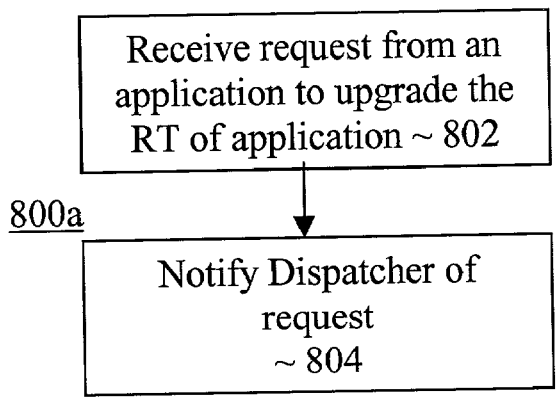
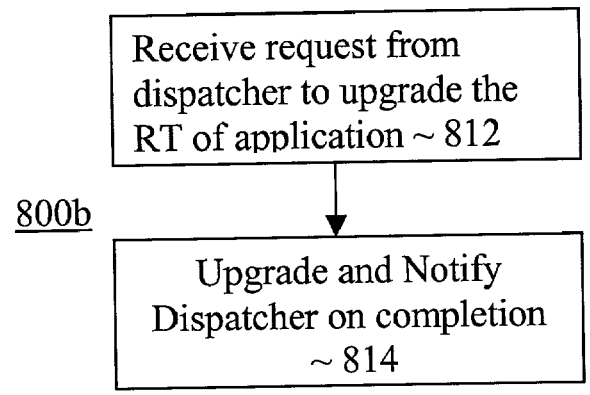
Figure 8a          Figure 8b
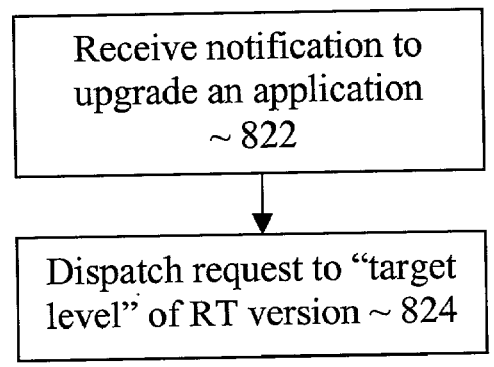
Figure 8c

METHOD AND APPARATUS FOR MULTI-VERSION UPDATES OF APPLICATION SERVICES

RELATED APPLICATION

This application is a continuation-in-part application of U.S. application Ser. No. 09/803,178, entitled "*Multi-Version Hosting of Application Services*", filed on Mar. 9, 2001.

BACKGROUND OF THE INVENTION

1. Field of the Invention

The present invention relates to the field of hosting application services. More specifically, the present invention relates to the issue of concurrently hosting application services with multiple versions of the hosting services.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn the local area networks are interconnected together through wide area networks, such as ATM networks, Frame Relays, and the like. Of particular notoriety is the TCP/IP based global inter-networks, the Internet.

As a result this trend of increased connectivity, increasing number of applications that are network dependent are being deployed. Examples of these network dependent applications include but are not limited to, email, net-based telephony, world wide web and various types of e-commerce. Further, increasing number of software applications that were traditionally licensed or distributed through discrete distribution medium, such as diskettes, CDROMs and the like, are being distributed online or offered as web based applications, through private intranets or public networks like the Internet.

The increased popularity of network based applications and offering of traditional software applications as application services have in turn led to the emergence of application service providers who host application services for their developers, to relieve the developers from having to maintain and operate the underlying infrastructure. To differentiate from one another, application service providers may offer hosting services or hosting runtime supports that offer functionality, usability or performance improvements over their competitors.

Thus, just like any traditional system and subsystem software developers, application service providers have a need to continually update and enhance their hosting runtime services. Likewise, just like any traditional system and subsystem software, the updates and enhancements could have significant impact on the application services they host or support. In fact, the impact of updates or enhancements to the hosting service runtime support potentially could be more profound than traditional system or subsystem software. In the case of traditional system/subsystem software, generally not all licensees update their system at the same time. As a result, they tend to impact the earlier adopters only. However, in the case of application service providers, once the updates or enhancements are promoted, all hosted application services (and their millions of users) are immediately impacted. Thus, it is desirable for application service providers to provide concurrent support for multiple versions of its hosting services or runtime support to allow gradual adoption of the new versions by the hosted application services.

However, offering concurrent support of multiple versions is not simply a matter of making the various versions available. Preferably, the concurrent support is provided in a transparent manner to the hosted applications, automatically employing the appropriate version of hosting services/runtime support. Further, as time goes on, the multiplicity of versions would inevitably become a significant burden to the application service providers, and resources become inefficiently utilized. For example, only a handful of infrequently used application services may still require the earlier versions of the runtime services. Thus, to treat all versions equally, in terms of initialization, resource allocations and like, would be extremely costly and inefficient.

Accordingly, a new approach to hosting application services, and operating the resources of an application service provision apparatus to facilitate multi-version hosting of application services is needed.

SUMMARY OF THE INVENTION

Successor versions of an application service provision runtime library of an application service provision apparatus are provided with corresponding update services to facilitate update of applications to selected ones of the successor versions on request.

In various embodiments, a dispatcher of the application service provision apparatus is provided with complementary functions to coordinate the servicing of the update requests.

In one embodiment, an application submits an update request to the update service of the application's current version of the runtime library used. In response, the update service notifies the dispatcher of the request. The dispatcher then notifies the update service of the first successor version of the runtime library, which in response, updates the application to use the successor version of the runtime library. The dispatcher successively repeats the process until the desired version of the runtime library is reached. Each of the update services is equipped to update the application from an immediate predecessor version of the runtime library.

In an alternate embodiment, in response, the dispatcher notifies the update service of the target version of the runtime library directly, which in response, updates the application to use the target version of the runtime library. Each of the update services is equipped to update the application from any predecessor version of the runtime library.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates a data structure suitable for use by the dispatching function of FIG. 1 to track the required version of the runtime library, in accordance with one embodiment;

FIG. 4 illustrates a data structure suitable for use by the shared resource monitoring function of FIG. 1 to track the last used time of shared resource allocations, in accordance with one embodiment;

FIGS. 8a–8c illustrate the operational flow of the relevant aspects of the update services of the various versions of the runtime library and the dispatcher to facilitate update of an application from one version to a successor version, in accordance with another embodiment.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, accepting, determining, inquiring, notifying, caching, routing, loading, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
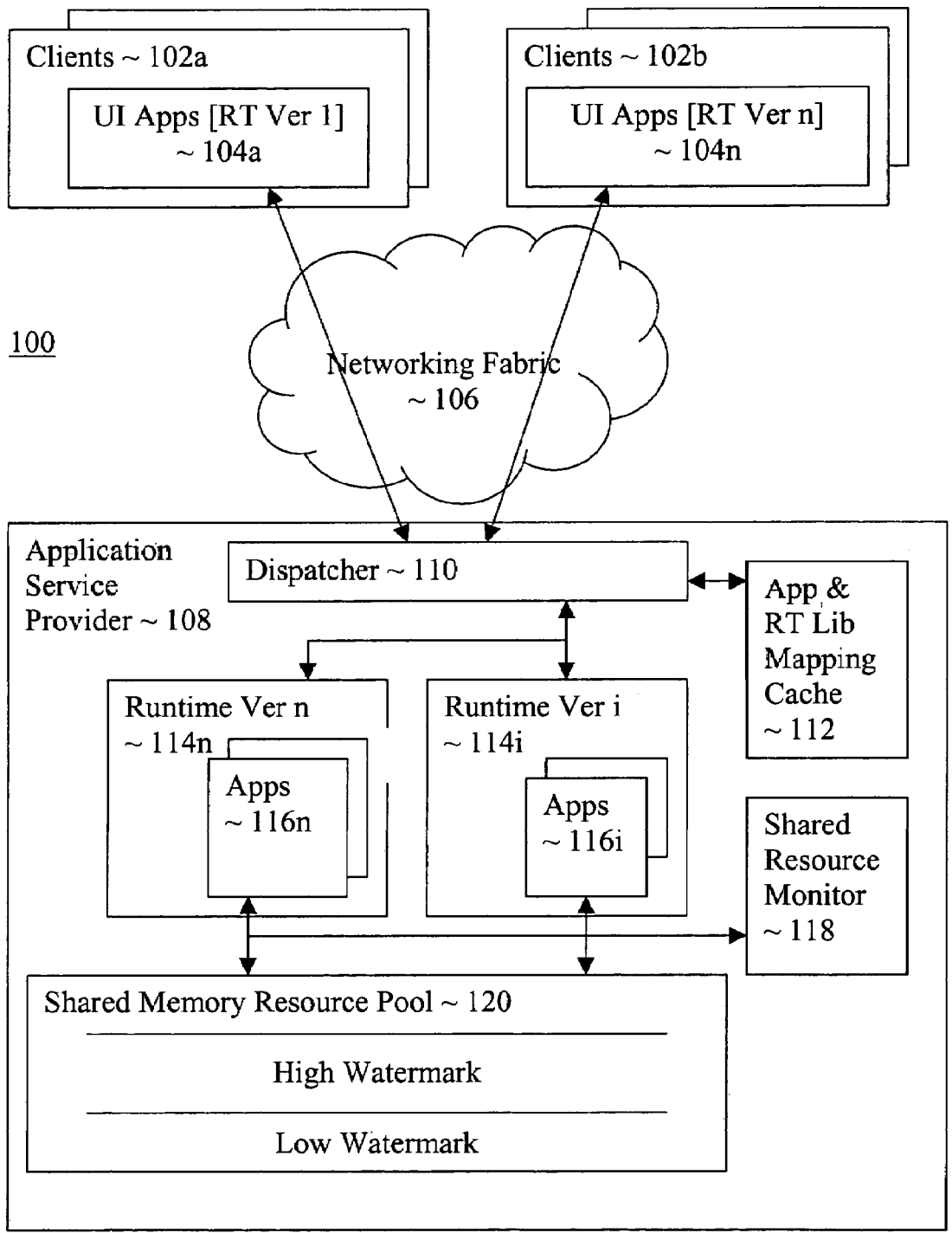
FIG. 1 illustrates an overview of the present invention, including an application service provision apparatus having one or more components to perform a dispatching and a shared resource monitoring function, in accordance with one embodiment.

Referring now to FIG. 1, wherein a block diagram illustrating an overview of the present invention, including an application service provision apparatus equipped with a dispatching and a shared resource monitoring function, in accordance with one embodiment, is shown. As illustrated, application service provision apparatus 108 hosts a number of application services, e.g. 116i and 116n, on behalf of their developers. Apparatus 108, enabled by features of the present invention, is advantageously equipped with different versions of runtime support, also referred to as the runtime library, e.g. 114i and 114n. The different hosted application services, for stability and/or other reasons, "require" these different versions of the runtime library. For example, application services 116n (perhaps because of certain new features offered) require the latest version 114n of the runtime library, while application services 116i (perhaps because of backward compatibility reasons) "require" an earlier version 114i of the runtime library. Clients 102a and 102b access these various application services, e.g. 116i and 116n (hereinafter, simply 116*), through networking fabric 106, using various known messaging protocols (e.g. HTTP) signaled in accordance with various known communication protocols (e.g. TCP/IP).

In addition to the hosted application services 116* and the various versions of the runtime library, e.g. 114i and 114n (hereinafter, also simply 114*), apparatus 108 also includes one or more resources shared by the application services 116* and/or the functions of the runtime library 114*, e.g. memory resource 120. Further, in accordance with the present invention, apparatus 108 is provided with dispatcher function 110, and shared resource monitor function 118 to facilitate the current support of the multiple versions of runtime library, and efficient operation of the resources. Moreover, for the embodiment, dispatcher function 110 also has an associated application and runtime (RT) library version mapping cache 112.

More specifically, dispatcher function 110 is employed to perform the dispatching function, i.e. routing of requests for service from clients 102a–102b to selected ones of the application services hosted. As will be described in more details below, in one embodiment, dispatcher function 110 advantageously performs the dispatching or routing in a manner that allows the earlier versions of runtime library 114* to be loaded on an as needed basis, thereby enabling apparatus 108 to support the multiple version as well as operate more efficiently. Monitor function 118 is employed to perform a monitoring function to allow resources such as memory resource 120 to be shared among application services 116* hosted and/or the functions of runtime library 114* (collectively also referred to as resource consumers at times, when convenient to do so). Accordingly, these elements together enable apparatus 108 to operate more efficiently, and in turn practically provide the multi-version support.

Except for the provision of dispatcher function 110, its associated mapping cache 112, and monitor function 118 to facilitate efficient operation of apparatus 108, apparatus 108 including its runtime library 114*, application services 116*, client 102a/102b and networking fabric 106 are all intended to represent a broad range of such elements known in the art. In particular, examples of these application services include but are not limited to email applications, e-commerce applications, word processing applications, spreadsheet applications, and so forth, and clients 102a–102b may be wireless or wireline based computing devices of various form factors, including but are not limited to palm sized, notebook sized or desktop sized. Moreover, the present invention contemplates that apparatus 108 may be implemented using one or more computer servers interconnected in any one of a number of known coupling techniques, including but are not limited to dedicated channels, local area networks or wide area networks. Examples of runtime library functions include but are not limited to security functions, script functions, database access functions, and so forth. Accordingly, these elements, i.e. elements 108, 114*, 116*, 120, 102a/102b and 106, will not be further described. Dispatcher function 110, including its associated mapping cache 112, and monitor function 118 will be described in turn below.

However, before describing these elements in further detail, it should be noted that while for ease of understanding, only a handful of application services 116*, a handful of runtime library versions 114* and a handful of clients 102a/102b are shown in FIG. 1, from the description to follow, it will be readily apparent to those skilled in the art that the present invention may be practiced with many more (as well as less) application services 116*, runtime library versions 114*, and clients 102a/102b. Further, while for ease of understanding, dispatcher function 110 and monitor function 118 are described as separate functions, they may be implemented as one or more components.

Dispatcher Function

Figure 2:
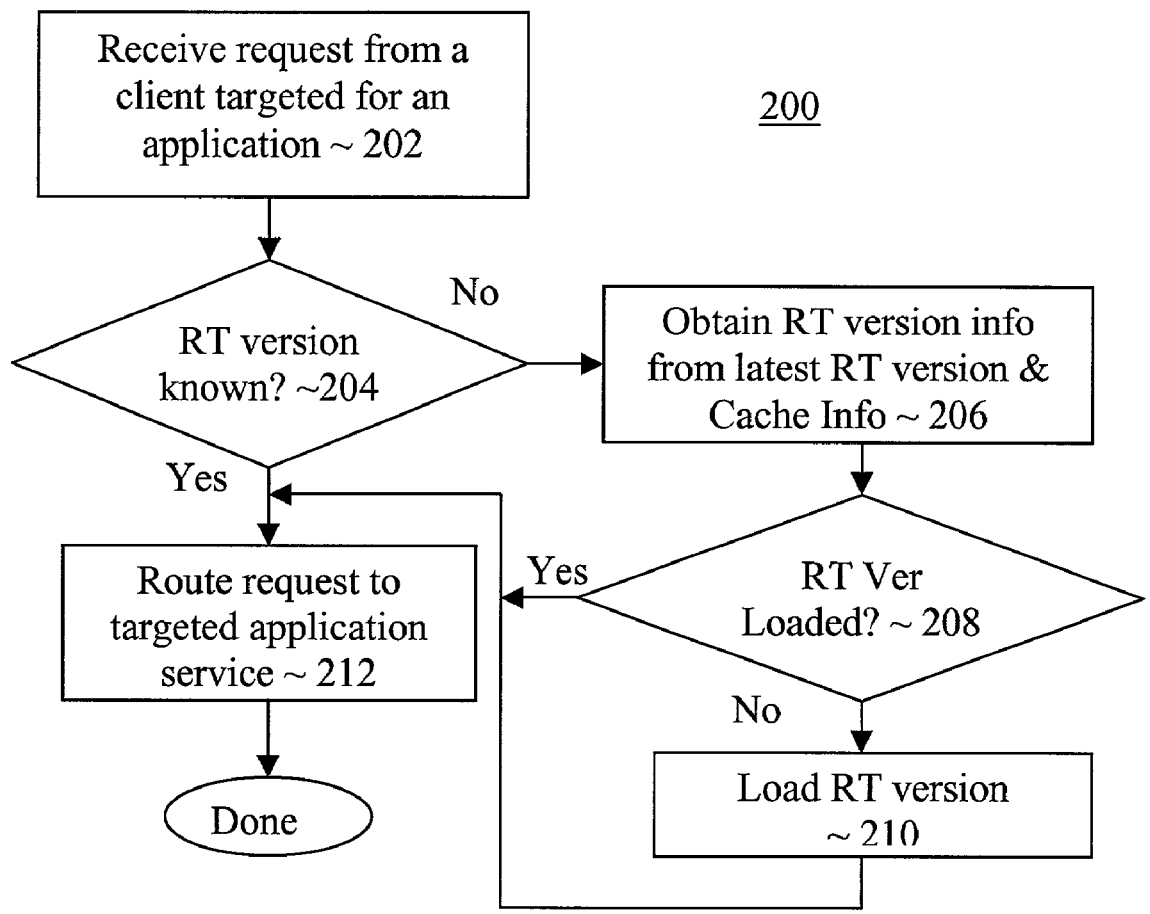
FIG. 2 illustrates the operational flow of the relevant aspects of the dispatching function of FIG. 1, in accordance with one embodiment.

Referring now to FIG. 2, wherein a flow diagram illustrating the relevant aspects of the operation flow of dispatcher function 110, in accordance with one embodiment, is shown. The embodiment contemplates that at start up (i.e. power on/reset), for perhaps efficiency reason, only the latest version of the application service hosting runtime library 114n is loaded. Moreover, the latest version includes a dynamically callable function that upon invocation, returns the required version of runtime library 114* for a particular application service hosted. As illustrated, the operation process starts with dispatcher function 110 receiving a request for service targeted for a hosted application service from a client, block 202. Upon receiving such a request, dispatcher function 110 determines if the version of the runtime library required by the targeted application service is known to itself, block 204. If the version of the runtime library required by the targeted application service is not known to dispatcher 110, it invokes the earlier described dynamically callable function of the latest version of the runtime library to obtain the version of the runtime library required by the targeted application service, block 206. Upon obtaining the information, for the embodiment, dispatcher function 110 also caches the information in the earlier described mapping cache, thus making the information available for subsequent requests targeting the same application service (until the cache line holding the information is selected for use to cache the required version information of another application service hosted). [See FIG. 3 for an example of a data structure suitable for use as a cache for caching the required version information for the various application services hosted. An example of a suitable cache line replacement scheme is a least recently used (LRU) scheme.]

Additionally, upon learning of the required version, dispatcher function 110 determines if the required version has been loaded, block 208. If the required version of the runtime library has not been loaded (e.g. the required version is an earlier version, and it has not been required by any of the targeted application services of prior requests), dispatcher function 110 loads the required earlier version of the runtime library on demand, block 210. In alternate embodiments, the present invention may be practiced with some or all of the executable code/libraries of the one or more of the earlier versions also pre-loaded.

Upon determining that the required version is known to itself (i.e. the required version information is cached in mapping cache, implying that it has previously been requested, accordingly loaded) (block 204), or determining that the required version is not known but loaded (e.g. due to cache line replacement) (block 208) or for some embodiments, loading the required version (e.g. being required for the first time) (block 210), dispatcher function 110 routes the request for service to the targeted application service (which will be properly supported, as the required version of the runtime library is now loaded).

Thus, it can be seen from the above description, the required version of a runtime library may be determined. Further, for various embodiments, earlier versions of runtime library 114* are loaded only on an as needed basis, i.e. when required by an application service targeted by a request for service received from a client. Accordingly, apparatus 108 may operate more efficiently, while allowing for multi-version hosting runtime support.

Monitor Function

Figure 5:
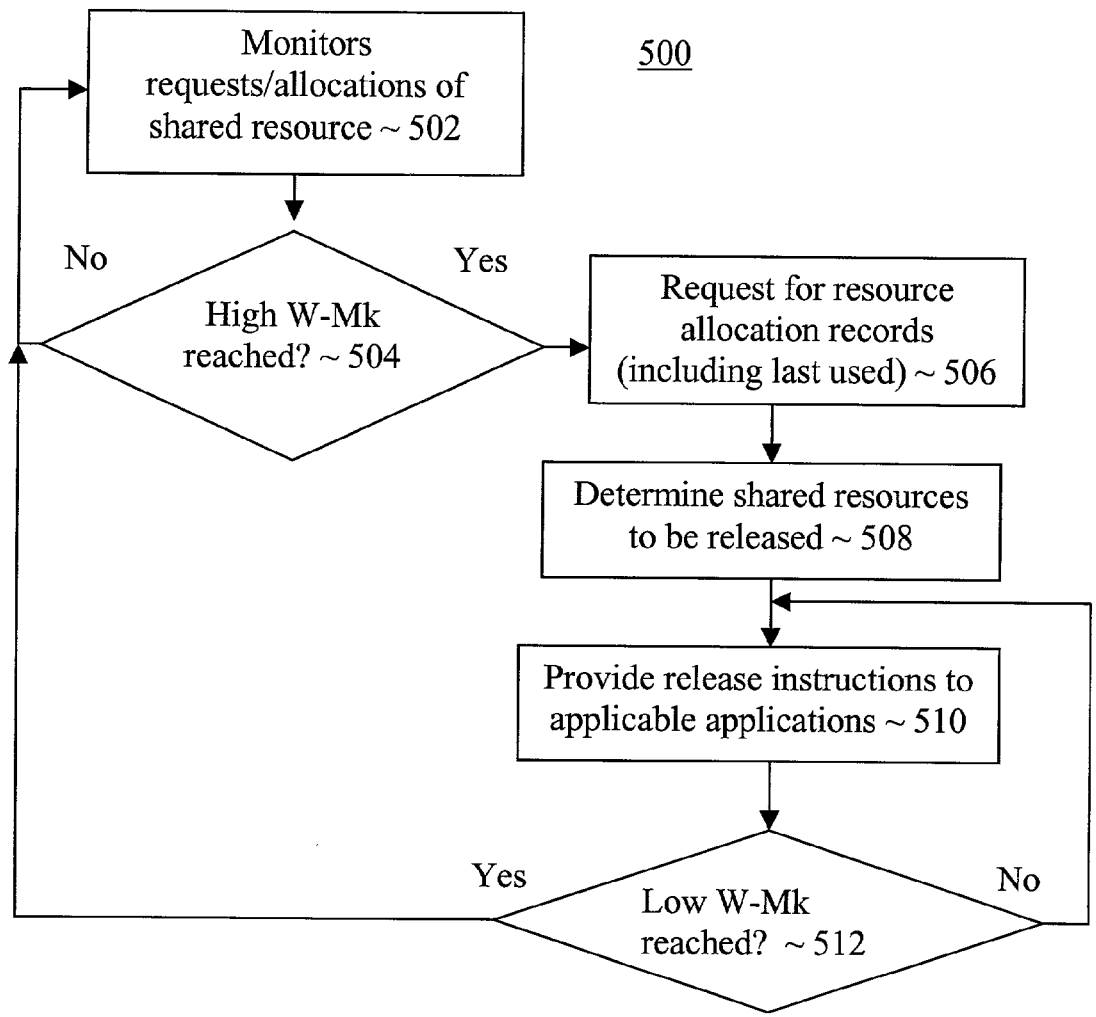
FIG. 5 illustrates the operational flow of the relevant aspects of the shared resource monitoring function of FIG. 1, in accordance with one embodiment.

Referring now to FIG. 5, wherein a flow diagram illustrating the relevant aspects of the operation flow of monitor function 118, in accordance with one embodiment, is shown. As described earlier, monitor function 118 is employed to facilitate the sharing of certain resources, e.g. memory resource 120, among the resource consumers, i.e. the application services hosted and/or the functions of the various versions of the runtime library. The embodiment contemplates that various portions of shared memory resource 120 are allocated to the resource consumers on an as needed basis. Moreover, the allocation and the de-allocation requests are routed through monitor function 118. Further, the various resource consumers keep track of the usage of the various portions of shared memory resource 120 allocated. In particular, they keep track of the addresses and sizes of the allocations, as well as the time of last usage of each of the allocated portions of shared memory resource 120. An example data structure suitable for use to track such information is shown in FIG. 4.

As illustrated, upon initialization, monitor function 118 monitors the requests and/or allocations of the shared resource, block 502. It further continually determines if the aggregated allocation, i.e. the total current cumulative allocation, has reached a pre-determined threshold, also referred to as the "high watermark", block 504. As described earlier, all allocation requests are routed through monitor function 118, which maintains a counter to keep track of the current level of aggregated allocation. If the high watermark has not been reached, monitor function 118 simply continues operation back at block 502, and repeats the operation of block 504, until eventually it is determined that the aggregated allocation of shared memory resource 120 has reached the predetermined high watermark.

At such time, monitor function 118 requests the resource consumers (more specifically, those who received allocations) to provide it with the usage records of the allocated resources, block 506. Of particular interest to be provided, is the time of last use of these allocations by the corresponding recipient entities.

Upon receipt of these information from the resource consumers, monitor function 118 determines the allocated shared memory resources to be released to bring the aggregated allocation back to at most another predetermined threshold, referred to as the low watermark, block 510. Upon making the determination, monitor function 118 instructs the resource consumers to release the selected resource portions accordingly.

In one embodiment, monitor function 118 makes the determination by merging and ordering the usage information received from the resource consumers. From the merged ordered set of the usage information, monitor function 118 "speculatively" selects a number of the least recently used allocations for release to attempt to bring the aggregated allocation back down to the low watermark.

Upon instructing the resource consumers, monitor function 118 continues its operation at block 512, determining if the instructions were sufficient to bring the total consumption of the shared resource down to the low watermark. As the instructed resource consumers begin to free previously allocated portions of the shared resource as instructed, monitor function 118 decrements the running counter it maintains for the amount of shared resources having been allocated. If the instructed de-allocations were able to bring the aggregated allocation back down to the low watermark monitor function 118 repeats the operation of block 510. In alternate embodiments, the entire sequence of operations of blocks 506–510 may be repeated instead. If the action or successive actions were successful in bringing the aggregated allocation back down to the low watermark, monitor function 118 continues its operation at block 502. Thus, memory resource 120 may be efficiently shared among the resource consumers, i.e. the hosted application services and the functions of the various versions of the runtime library.

As those skilled in the art would appreciate, other resources, such as data channels, may also be shared in like manner, under the control of monitor function 118 or a similar coordinator function, thereby allowing apparatus 108 to operate more efficiently.

Update

Referring back to FIG. 1, in accordance with another aspect of the present invention, to facilitate applications, e.g. application 116i, to be able to update to a selected one of the later versions of the runtime library, e.g. 114n, successor versions of the runtime library, e.g. 114n, are correspondingly provided with update services (not shown) to facilitate an application, e.g. 116i, to submit an update request to update the version of the runtime library the application uses to a later version, such as version 114n. For the illustrated embodiment, each update service of a version of the runtime library is equipped with the knowledge to update an application from the immediate predecessor version of the runtime library. That is, each update service of a version is equipped with the required compilation, linkage and/or other processing actions of like kind to be performed. In other words, for the embodiment, an application having "fallen behind" by two versions, making a request to update to the second successor version ("skipping" the immediate successor version) of the version used by the application, will nevertheless be first updated to the first successor version, and then to the second successor version. The exact nature of the compiles, linkages and so forth, involved with each update, are application dependent, and is not relevant to the essence of the present invention.

In one embodiment, dispatcher function 110 is also provided with complementary capabilities to coordinate the servicing of update requests, in particular, when successive updates crossing multiple successor versions of the runtime library is necessary to update a requesting application to the desired target version of the runtime library. In alternate embodiments, the upgrade services may communicate directly to each other, via e.g. shared data structure instead.

As will be readily apparent from the descriptions to follow, under the present invention, the requests may be advantageously made at times desired by the owners of the applications.

In one embodiment, it is contemplated that an application owner will include with its application a feature to submit such an update request, such that the owner of the application may submit the update request from its application. Preferably, the feature is "hidden" or may be invoked by a user of the application having the proper authority only. Provision of such safeguard features is within the ability of those ordinarily skilled in the art, accordingly, the subject will be not be further described.

Figure 7A:
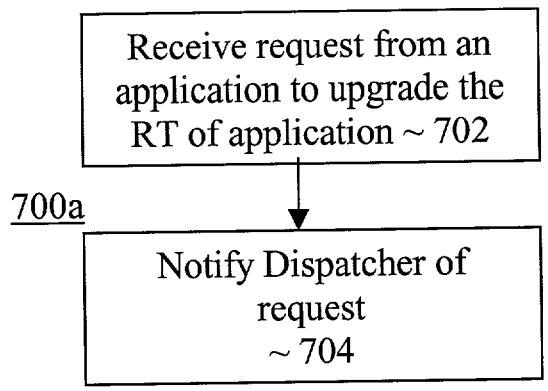
FIGS. 7a–7c illustrate the operational flow of the relevant aspects of the update services of the various versions of the runtime library and the dispatcher to facilitate update of an application from one version to a successor version, in accordance with one embodiment.
Figure 7B:
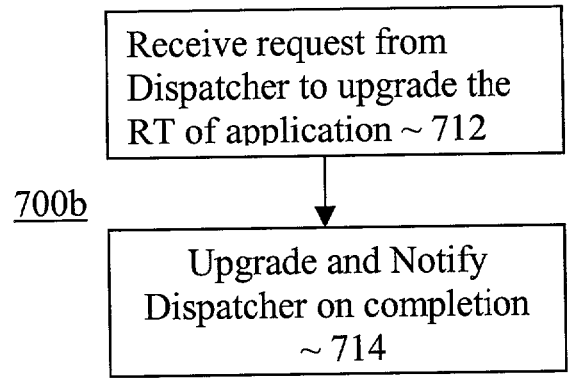
Figure 7C:
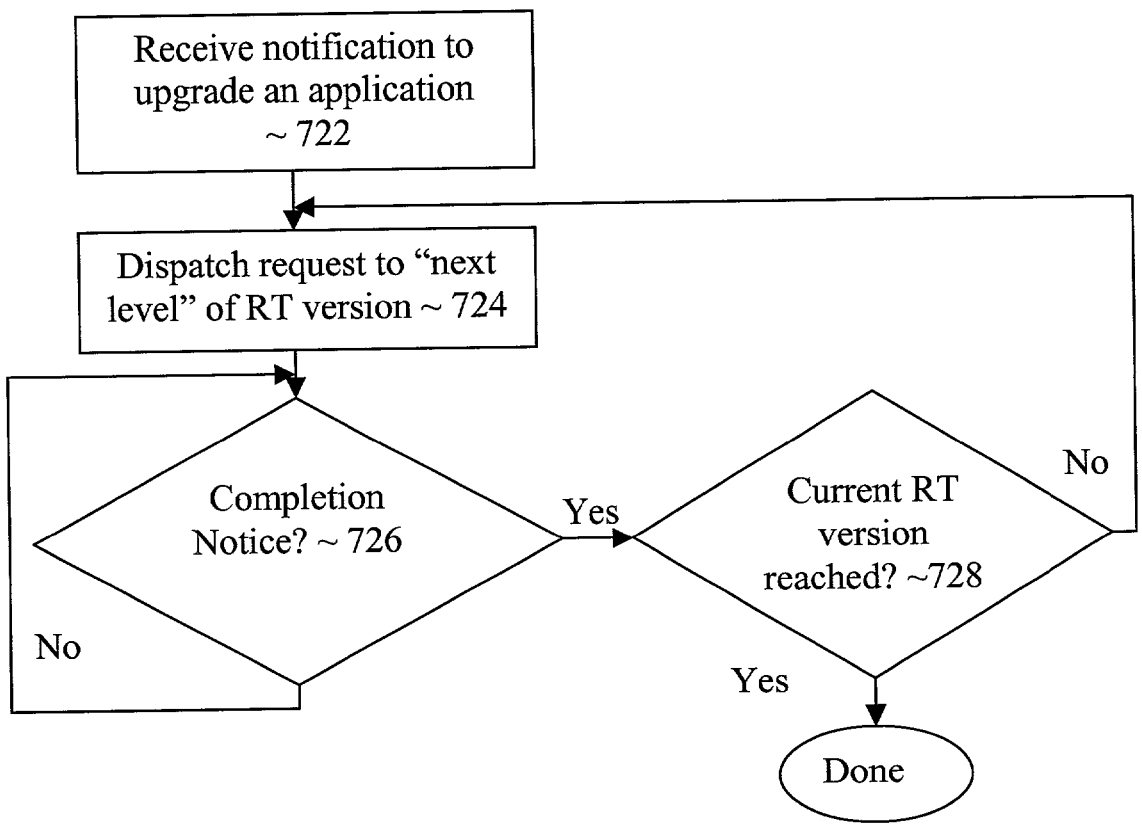

Referring now to FIGS. 7a–7c wherein three flow charts illustrating the operational flows of the relevant aspects of an upgrade service of a version of the runtime library, and dispatcher 110, in accordance with one embodiment, is shown. As illustrated in FIG. 7a, upon receipt of a request to update an application, block 702, the upgrade service of a version of the runtime library notifies dispatcher 110 of the request, block 704. In one embodiment, the request may include a specification of the target version, or the request will be defaulted to the most current version of the runtime library. Alternatively, the request may be defaulted to a predecessor version of the most current version, to allow one or more versions of the runtime library to be placed into the same environment for testing, but not for general update. Preferably, whether the specification is mandatory or optional and which version of the runtime library is the default target version are all configurable by a system administrator. The support for such configurability by a system administrator may be supported via any one of a number of configuration techniques known in the art; thus, will not be further described.

In any event, the target version, whether explicitly or implicitly specified, as alluded to earlier, may be the most current version of the runtime library, a predecessor version of the runtime library of one or more generation removed from the most current version of the runtime library. Viewed from another perspective, the target version may be an immediate successor version of the runtime library, a successor version of the runtime library of one or more generation removed from the version of the runtime library currently being used by the application.

As illustrated in FIG. 7c, for the illustrated embodiment, upon receipt of the update request, block 722, dispatcher 110 dispatches the request to the upgrade service of the "next" successor version of the runtime library (which on the "first pass", is the immediate successor version), block 724. Thereafter, dispatcher 110 awaits for the update completion notification from the notified upgrade service, block 726.

In alternate embodiments, dispatcher 110 may dispatch the request on a conditional basis, e.g. based on the "status" of the application, such as whether it has been properly licensed for the target version, and/or whether the owner of the application is current on its payment of the licensee fees.

As illustrated in FIG. 7b, the notified upgrade service of the "next" version, upon receipt of the notification, block 712, updates the application accordingly, block 714. Thereafter, upon completion of the update, the update service notifies dispatcher 110 of the completion, block 714.

Back at FIG. 7c, upon receipt of a completion notification from the previously notified upgrade service of the "next" version of the runtime library, dispatcher 110 determines whether the desired target version has been reached or not, block 728. If the desired target version has not been reached, dispatcher 110 returns to block 724, and continues the process from there. On the other hand, if the desired target version has been reached, the update process is completed.

Accordingly, under the present invention, an owner of an application hosted by the application service of the present invention, may advantageously elect to request to update his/her application to use a later version of the runtime library at a time of his/her desire, and be updated successively Referring back to FIG. 1 again, in accordance with another embodiment of the present invention, to facilitate applications, e.g. application 116$i$, to be able to update to a selected one of the later versions of the runtime library, e.g. 114$n$, successor versions of the runtime library, e.g. 114$n$, are correspondingly provided with update services (not shown) to facilitate an application, e.g. 116$i$, to submit an update request to update the version of the runtime library the application uses to a later version, such as version 114$n$. For this alternate embodiment, each update service of a version of the runtime library is equipped with the knowledge to update an application from any predecessor version of the runtime library. That is, each update service of a version is equipped with the required compilation, linkage and/or other processing actions of like kind to be performed, to update an application from any of the predecessor or down leveled runtime library versions used.

Under this alternate embodiment, dispatcher function 110 is still provided with complementary capabilities to coordinate the servicing of update requests. In yet other embodiments, the update services may communicate directly to each other, via e.g. shared data structure instead.

As the earlier described embodiment, it is also contemplated that an application owner will include with its application a feature to submit such an update request, such that the owner of the application may submit the update request from its application. Preferably, the feature is "hidden" or may be invoked by a user of the application having the proper authority only. Provision of such safeguard features is within the ability of those ordinarily skilled in the art, accordingly, the subject will be not be further described.

Referring now to FIGS. 8$a$–8$c$ wherein three flow charts illustrating the operational flows of the relevant aspects of an update service of a version of the runtime library, and dispatcher 110, in accordance with this alternate embodiment, is shown. As illustrated in FIG. 8$a$, upon receipt of a request to update an application, block 802, the update service of a version of the runtime library notifies dispatcher 110 of the request, block 804. As before, the request may include a specification of the target version, or the request will be defaulted to the most current version of the runtime library. Alternatively, the request may be defaulted to a predecessor version of the most current version, to allow one or more versions of the runtime library to be placed into the same environment for testing, but not for general update. Preferably, whether the specification is mandatory or optional and which version of the runtime library is the default target version are all configurable by a system administrator. The support for such configurability by a system administrator may be supported via any one of a number of configuration techniques known in the art; thus, will not be further described.

Thus, as before, the target version, whether explicitly or implicitly specified, as alluded to earlier, may be the most current version of the runtime library, a predecessor version of the runtime library of one or more generation removed from the most current version of the runtime library. Viewed from another perspective, the target version may be an immediate successor version of the runtime library, a successor version of the runtime library of one or more generation removed from the version of the runtime library currently being used by the application.

As illustrated in FIG. 8$c$, for the alternate embodiment, upon receipt of the update request, block 822, dispatcher 110 dispatches the request to the update service of the target version of the runtime library, lock 824. Thereafter, dispatcher 110 awaits for the update completion notification from the notified update service.

As before, dispatcher 110 may dispatch the request on a conditional basis, e.g. based on the "status" of the application, such as whether it has been properly licensed for the target version, and/or whether the owner of the application is current on its payment of the licensee fees.

As illustrated in FIG. 8$b$, the notified update service of the target version, upon receipt of the notification, block 812, updates the application accordingly, block 814. Thereafter, upon completion of the update, the update service notifies dispatcher 110 of the completion, block 814.

Accordingly, under this embodiment, an owner of an application hosted by the application service of the present invention, may advantageously elect to request to update his/her application to use a later version of the runtime library at a time of his/her desire, and be updated to the desire version directly.

Example Computer System

Figure 6:
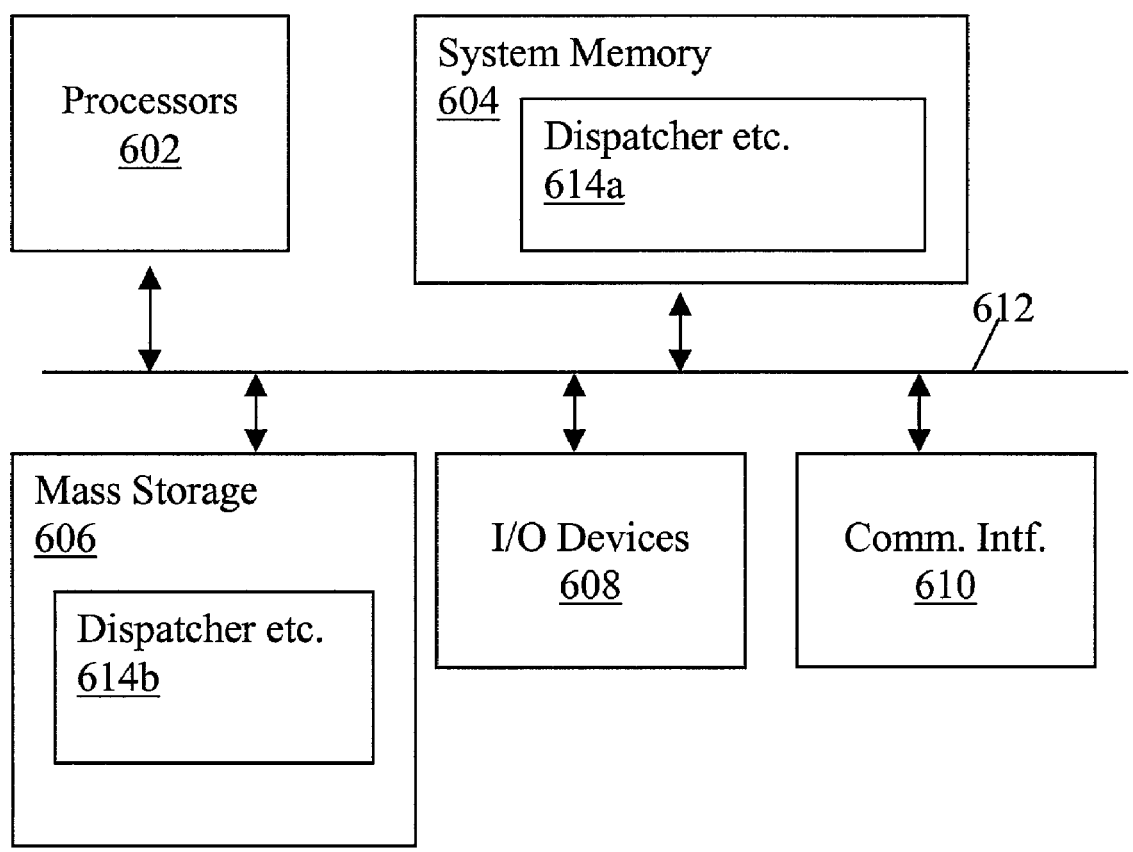
FIG. 6 illustrates an internal component view of a computer system suitable for use to practice the present invention, in accordance with one embodiment.

FIG. 6 illustrates an example computer system suitable for use as a server for implementing application service provision apparatus 108 (or a portion thereof), in accordance with one embodiment. As shown, computer system 600 includes one or more processors 602 and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the dispatcher and monitor functions as well as other aspects of the present invention. The permanent copy of the programming instructions may be loaded into mass storage 606 in the factory, or in the field, as described earlier, through a distribution medium (not shown) or through communication interface 610 (from a distribution server (not shown). The constitution of these elements 602–612 are known, and accordingly will not be further described.

Conclusion and Epilog

Thus, an improved method and apparatus for hosting application services with multiple versions of the hosting runtime services, including update services, has been described. While the present invention has been described in terms of the above illustrated embodiments, those skilled in the art will recognize that the invention is not limited to the embodiments described. The present invention can be practiced with modification and alteration within the spirit and scope of the appended claims. For example, the resolution of the appropriate version of the hosting services may be performed by a version other than the "latest" version (e.g. when the "latest" version is a "beta" version), as well as by other means independent of the individual versions themselves. Thus, the description is to be regarded as illustrative instead of restrictive on the present invention.

What is claimed is:

1. In an application service provision apparatus having an application service provision runtime library with multiple versions, a method of operation comprising:
   receiving, by a first update service of a first version of said application service provision runtime library, a request to update an application to a second later version of the runtime library; and
   a second update service of said second later version of the runtime library upgrading said application to said second later version of the runtime library.

2. The method of claim 1, wherein said second later version of the runtime library is a selected one of the most current version of the runtime library and a predecessor version of the most current version of the runtime library.

3. The method of claim 1, wherein said second later version of the runtime library is a selected one of an immediate successor version of said first version of the runtime library and a successor version of greater than one generation removed from said first version of the runtime library.

4. The method of claim 1, wherein the method further comprises:
   said first update service of said first version of said application service provision runtime library notifying a dispatcher of said application service provision apparatus of said update request; and
   said dispatcher notifying said second update service of said second version of said application service provision runtime library of said request.

5. The method of claim 4, wherein said second later version of the runtime library is a successor version of greater than one generation removed from said first version of the runtime library, and said method further comprises:
   said dispatcher notifying a third update service of an immediate successor version of said first version of the runtime library of said request;
   said third update service of said immediate successor version upgrading said application to said immediate successor version of the first version of the runtime library; and
   said third update service of said immediate successor version notifying said dispatcher of completion upon upgrading said application to said immediate successor version of the first version of the runtime library.

6. The method of claim 4, wherein said second later version of the runtime library is greater than one generation removed from said first version of the runtime library, and said method further comprises:
   said dispatcher notifying a third update service of an immediate predecessor version of said second version of the runtime library of said request;
   said third update service of said immediate predecessor version upgrading said application to said immediate predecessor version of the second version of the runtime library; and
   said third update service of said immediate predecessor version notifying said dispatcher of completion upon upgrading said application to said immediate predecessor version of the second version of the runtime library.

7. The method of claim 4, wherein said second later version of the runtime library is a successor version of greater than one generation removed from said first version of the runtime library, said dispatcher notifying said second update service of said second version of said application service provision runtime library of said request directly, and said second update service upgrading said application to said second version of the runtime library.

8. An apparatus comprising:
   storage medium having stored therein programming instructions designed to implement a dispatcher on the apparatus to
   receive notification, from a first update service of a first version of an application service provision runtime library, of an application requesting update to a second later version of the application service provision runtime library, and
   notify a second update service, of said second later version of the application service provision runtime library, of said request; and
   at least one processor coupled to the storage medium to execute the programming instructions.

9. The apparatus of claim 8, wherein said second later version of the runtime library is a selected one of the most current version of the runtime library and a predecessor version of the most current version of the runtime library.

10. The apparatus of claim 8, wherein said second later version of the runtime library is a selected one of an immediate successor version of said first version of the runtime library, and a successor version of greater than one generation removed from said first version of the runtime library.

11. The apparatus of claim 8, wherein said second later version of the runtime library is a successor version of greater than one generation removed from said first version of the runtime library, and dispatcher is further equipped to notify a third update service of an immediate successor version of said first version of the runtime library to update said application to said immediate successor version of the first version of the runtime library, and to receive notification from said dispatcher of completion upon upgrading said application to said immediate successor version of the first version of the runtime library.

12. The apparatus of claim 8, wherein said second later version of the runtime library is greater than one generation removed from said first version of the runtime library, and the dispatcher is further equipped to notify a third update service of an immediate predecessor version of said second version of the runtime library to update said application to said immediate predecessor version of the second version of the runtime library, and to notify said dispatcher of completion upon upgrading said application to said immediate predecessor version of the second version of the runtime library.

13. The apparatus of claim 8, wherein said second later version of the runtime library is a successor version of greater than one generation removed from said first version of the runtime library, said dispatcher notifying said second update service of said second version of said application service provision runtime library of said request directly, and said second update service upgrading said application to said second version of the runtime library.

14. An apparatus comprising:
   storage medium having stored therein programming instructions designed to implement a first version of an application service provision runtime library, including a first update service equipped with the ability to receive a request from an application to update the application to a second later version of the application service provision runtime library, and notify a selected one of
- a second update service of the second later version of the application service provision runtime library of said request, and
- a dispatcher of the apparatus of said request; and at least one processor coupled to the storage medium to execute the programming instructions.

15. The apparatus of claim 14, wherein said second later version of the runtime library is a selected one of the most current version of the runtime library, and a predecessor version of the most current version of the runtime library.

16. The apparatus of claim 14, wherein said second later version of the runtime library is a selected one of an immediate successor version of said first version of the runtime library, and a successor version of greater than one generation removed from said first version of the runtime library.

17. The apparatus of claim 14, wherein said first update service is further equipped to receive a notification from a selected one of
- a third update service of a predecessor version of said first version of the runtime library and
- a dispatcher of the apparatus, update, in response to the notification, said application to said first version of the runtime library, and notify the selected one of
- said third update service and
- said dispatcher of completion of said update of said application to said first version of the runtime library.

18. The apparatus of claim 14, wherein said first update service is further equipped to receive a notification from a third update service of a first predecessor version of said first version of the runtime library to update said application to said first version of the runtime library, to update, in response to the notification, said application to said first version of the runtime library, and to notify a fourth update service of a successor version of said first version of the runtime library to update said application to said successor version of the runtime library.

19. An apparatus comprising:

storage medium having stored therein programming instructions designed to implement a first version of an application service provision runtime library, including a first update service to receive a notification, from a selected one of
- a second update service of a predecessor version of said first version of the runtime library to update an application to said first version of the runtime library, and
- a dispatcher of the apparatus to update said application to said first version of the runtime library, update, in response to the notification, said application to said first version of the runtime library, and notify the selected one of
- said second update service and
- said dispatcher of completion of said update of said application to said first version of the runtime library; and at least one processor coupled to the storage medium to execute the programming instructions.

20. The apparatus of claim 19, wherein said first version of the runtime library is a selected one of the most current version of the runtime library, and a predecessor version of the most current version of the runtime library.

21. The apparatus of claim 19, wherein said first version of the runtime library is a selected one of an immediate successor version of said predecessor version of the runtime library, and a successor version of greater than one generation removed from said predecessor version of the runtime library.

22. An apparatus comprising:

storage medium having stored therein programming instructions designed to implement a first version of an application service provision runtime library, including a first update service to receive a notification from a second update service of a first predecessor version of said first version of the runtime library to update an application to said first version of the runtime library, update, in response to the notification, said application to said first version of the runtime library, and notify a third update service of a successor version of said first version of the runtime library to update said application to said successor version of the runtime library; and at least one processor coupled to the storage medium to execute the programming instructions.

23. The apparatus of claim 22, wherein said first version of the runtime library is a second predecessor version more than one generation earlier than the most current version of the runtime library.

24. The apparatus of claim 22, wherein said first version of the runtime library is an immediate successor version of said first predecessor version of the runtime library.

* * * * *

UNITED STATES PATENT AND TRADEMARK OFFICE
CERTIFICATE OF CORRECTION

PATENT NO. : 7,140,012 B2 Page 1 of 1
APPLICATION NO. : 09/912571
DATED : November 21, 2006
INVENTOR(S) : Pugh et al.

It is certified that error appears in the above-identified patent and that said Letters Patent is hereby corrected as shown below:

Column 3
Line 50, "...processor include..." should read --...processor includes...--.
Column 4
Line 42, "...multiple version..." should read --...multiple versions...--.
Column 8
Line 35, "...thus, will not..." should read --...thus, it will not...--.
Line 39, "...library, a predecessor..." should read --...library, or a predecessor...--.
Line 40, "... more generation removed..." should read --...more generations removed...--.
Line 43, "...library, a predecessor..." should read --...library, or a predecessor...--.
Line 45, "...more generation removed..." should read --...more generations removed...--.
Column 9
Line 10, "...successively..." should read --...successively.--.
Line 61, "...thus, will not..." should read --...thus, it will not...--.
Line 65, "...library, a predecessor..." should read --...library, or a predecessor...--.
Line 66, "...more generation removed..." should read --...more generations removed...--.
Column 10
Line 2, "...library, a predecessor..." should read --...library, or a predecessor...--.
Line 4, "...more generation removed..." should read --...more generations removed...--.
Line 9, "... lock 24..." should read --...block 24...--.
Line 27, "...the desire version..." should read --...the desired version...--.

Signed and Sealed this

Twenty-sixth Day of June, 2007

JON W. DUDAS
*Director of the United States Patent and Trademark Office*